US010826776B2

(12) United States Patent
Singh

(10) Patent No.: US 10,826,776 B2
(45) Date of Patent: Nov. 3, 2020

(54) INTEGRATED CONTINUAL IMPROVEMENT MANAGEMENT

(71) Applicant: ServiceNow, Inc., Santa Clara, CA (US)

(72) Inventor: Manjeet Singh, Milpitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 131 days.

(21) Appl. No.: 15/939,594

(22) Filed: Mar. 29, 2018

(65) Prior Publication Data

US 2019/0268233 A1    Aug. 29, 2019

Related U.S. Application Data

(60) Provisional application No. 62/635,254, filed on Feb. 26, 2018.

(51) Int. Cl.
*H04L 12/24* (2006.01)
*H04L 29/08* (2006.01)
*G06F 9/50* (2006.01)
*G06F 16/904* (2019.01)

(52) U.S. Cl.
CPC ........ *H04L 41/0896* (2013.01); *G06F 9/5038* (2013.01); *G06F 9/5072* (2013.01); *G06F 9/5083* (2013.01); *H04L 67/1008* (2013.01); *G06F 16/904* (2019.01)

(58) Field of Classification Search
CPC .... G06F 9/5038; G06F 9/5072; G06F 9/5083; G06F 16/904; G06Q 10/06; H04L 41/0896; H04L 67/1008; H04L 41/5025
See application file for complete search history.

(56) References Cited

U.S. PATENT DOCUMENTS

| 6,321,229 | B1 | 11/2001 | Goldman |
| 6,609,122 | B1 | 8/2003 | Ensor |
| 6,799,189 | B2 | 9/2004 | Huxoll |
| 6,816,898 | B1 | 11/2004 | Scarpelli |
| 6,895,586 | B1 | 5/2005 | Brasher |
| 7,020,706 | B2 | 3/2006 | Cates |
| 7,027,411 | B1 | 4/2006 | Pulsipher |
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |

(Continued)

*Primary Examiner* — Nicholas R Taylor
*Assistant Examiner* — Michael Li
(74) *Attorney, Agent, or Firm* — Fletcher Yoder, P.C.

(57) ABSTRACT

A method includes creating a record of a continual improvement process (CIP) on a hosted client instance based on detection of one or more optimizations to improve at least one of a plurality of actions associated with the hosted client instance; setting a monitored metric with a predetermined target corresponding to the record to measure progress of the CIP over time based on analytical data associated with the monitored metric; setting one or more identified tasks associated with the monitored metric and monitor completion of the one or more identified tasks; and presenting progress data indicating progress toward achieving the monitored metric over time and indicating whether the monitored metric was achieved based on whether the analytical data associated with the monitored metric indicates that the predetermined target was met.

18 Claims, 11 Drawing Sheets

(56) References Cited

U.S. PATENT DOCUMENTS

| | | |
|---|---|---|
| 7,350,209 B2 | 3/2008 | Shurri |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scaroelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Milousheff |
| 8,812,539 B2 | 8/2014 | Kowalski |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Ante |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 4/2017 | Mueller |
| 9,654,473 B2 | 5/2017 | Miller |
| 9,659,051 B2 | 5/2017 | Hutchins |
| 9,766,935 B2 | 9/2017 | Keikar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 10,002,203 B2 | 6/2018 | George |
| 2010/0017782 A1* | 1/2010 | Chaar .................. G06Q 10/06 717/101 |
| 2013/0097304 A1* | 4/2013 | Asthana ............. H04L 41/5025 709/224 |

* cited by examiner

FIG. 6

Improvement Process CS10001072

Follow ▼ | Cancel | Update | Delete

Goals | Schedule | Details | Notes | Closure Notes

Specify how you will measure progress of this Improvement Request

| Progress Measurement Method | Automated PA Indicator |
| --- | --- |
| Improvement KPI | Incident backlog growth |
| Breakdown | Category |
| Element | Software |
| 2nd Breakdown | |
| Time Series | |

Base Value: 10
% Improvement: 25
Target value: 7.5
Target Review Date: 2018-07-01 14:48:09

Expected Outcomes:
1. This process should have significant impact on Overall Customer Experience Feedback
2. Large Value should have been met
3. Measure it for next one quarter to make sure there is no fallback of improvement Cancel | Update | Delete

Related Links
Create Demand
Create PA Indicator
Create Project

Continual Improvement Workbench

Overview | Planning | Discovery

Your Benchmarks ☐ | [Create Improvement] | [View Standard List]

🔍 Search Keywords

Sort by: [Rank ▲▼]

Under Implementation

| Reduce incident backlog by 20% | Improve CSAT score | Online Order Entry Performance Improvements | Improve MTIR to 5 Hours by end of Q2 | eCommerce through mobile |
|---|---|---|---|---|
| 100% Completed | 75% Completed | 75% Completed | 75% Completed | 75% Completed |
| Assigned to Chad Smith | Priority-Critical Due Date 3/15/18 | Assigned to Sam Goodlife | Priority-Moderate Due Date 12/18/17 | Assigned to Chad Smith | Priority-Low Due Date 2/11/18 | Assigned to Christy Hall | Priority-High Due Date 4/1/18 | Assigned to Josh Walters | Priority-Critical Due Date 2/28/18 |

| ServiceWatch implementation | Notifications disabled in this ServiceNow instance | Email storage enhancement | Decrease the "follow-up" calls to service desk | Reduce % of reopened incidents  Closed |
|---|---|---|---|---|
| 75% Completed | 75% Completed | 75% Completed | 75% Completed | 75% Completed |
| Assigned to Christy Hall | Priority-Critical Due Date 2/11/18 | Assigned to Sam Goodlife | Priority-Critical Due Date 2/11/18 | Assigned to Josh Walters | Priority-Critical Due Date 2/11/18 | Assigned to Chad Smith | Priority-Critical Due Date 2/11/18 | Assigned to Sam Goodlife | Priority-Critical Due Date 2/11/18 |

1-10 of 13 items shown    [View All]

Under Review

| Coordinator | Record Number | Name | Trending | Target Goal | Target Date |
|---|---|---|---|---|---|
| Chad Smith | CI1235689Z | Reduce % of reopened incidents | 〰️ | 20% | 12/18/17 ⚠ |
| Sam Goodlife | CI1235689Z | Improve CSAT score | 〰️ | 1200 | 1/25/18 ⚠ |
| Josh Walters | CI1235689Z | Reduce % of reopened incidents | 〰️ | 10% | 2/20/18 |

900

INTEGRATED CONTINUAL IMPROVEMENT MANAGEMENT

RELATED CASES

This application claims priority to and benefit of U.S. Provisional Patent Application Ser. No. 62/635,254, filed Feb. 26, 2018, entitled "Continual Improvement Management (CIM)," by Manjeet Singh, for all applicable purposes, including a right of priority, the contents of which are incorporated by reference herein, in their entirety.

TECHNICAL FIELD

Embodiments described herein generally relate to cloud computing and in particular to systems, methods and computer-readable mediums (programs) for managing end-to-end process of continual improvement of services, processes and functions of an enterprise in a standardized, organized, and efficient manner.

BACKGROUND

Cloud computing relates to sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

The enterprise may utilize a variety of SaaS and/or PaaS based software applications that are deployed on an instance hosted in the cloud for the enterprise. Various users (e.g., process owners, service managers, helpdesk managers, IT staff, analysts, development or project managers, management staff) associated with the enterprise may utilize the instance to access, provide or manage various services, processes, or functions related to the enterprise. The users may wish to submit various improvement initiatives (i.e., improvement processes) to continuously improve one or more of the services, processes, or functions of the enterprise. The improvement processes may be of different types (e.g., solve identified problems, close process gaps, provide coaching opportunities) and may align with different high-level goals and objectives of the enterprise (e.g., improve customer satisfaction, reduce operation cost, increase revenue).

Conventionally, improvement processes are created in a reactive manner and are a result of an unstructured approach to continual improvement. Further, different improvement processes (initiatives) relating to different services, processes or functions of the enterprise may be carried out in different silos by disjointed groups of enterprise users who are unaware of the other ongoing improvement processes related to other services, processes or functions of the enterprise. Creation of the improvement processes is not proactive or driven by real-time data insights. Rather, it is a highly manual process that is performed through different tools and complexities. The users submitting, implementing, or managing the improvement processes may be unaware of the various interdependencies and regressions between the different improvement processes and between corresponding processes, services, or functions. For example, progress of one improvement process may indicate improvement in one process or service. But unaware to the user, such improvement may lead to a decline in another process or service thereby necessitating creation of an improvement process for the declined process or service. The conventional approach may also be cost intensive because it may require hiring consultants to analyze the services, processes, or functions of the enterprise to identify the areas for improvement. A better approach to manage continual improvement is desirable.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method includes creating, with one or more processors, a record of a continual improvement initiative or process on a hosted client instance based on detection of one or more optimizations to improve at least one of a plurality of actions associated with the hosted client instance, wherein the continual improvement process corresponds to the at least one of the plurality of actions; setting, with the one or more processors, a monitored metric with a predetermined target corresponding to the record to measure progress of the continual improvement process over time based on analytical data associated with the monitored metric, the analytical data including at least one of key performance indicator (KPI) data, survey and assessment data, and external analytical data; setting, with the one or more processors, one or more identified tasks associated with the monitored metric and monitor completion of the one or more identified tasks; and presenting, with the one or more processors, progress data indicating progress toward achieving the monitored metric over time and indicating whether the monitored metric was achieved based on whether the analytical data associated with the monitored metric indicates that the predetermined target was met.

In another embodiment, the method may be embodied in computer executable program code and stored in a non-transitory storage device. In yet another embodiment, the method may be implemented on a computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 6 shows an illustrative screen shot of GUI 600 for setting a measurable goal (i.e., monitored metric) with a predetermined target in accordance with one or more embodiments.

FIG. 9 shows a screen shot of GUI 900 illustrating a workbench presenting progress data of a plurality of CIPs to a user in accordance with one or more embodiments.

DESCRIPTION OF EMBODIMENTS

Figure 1:
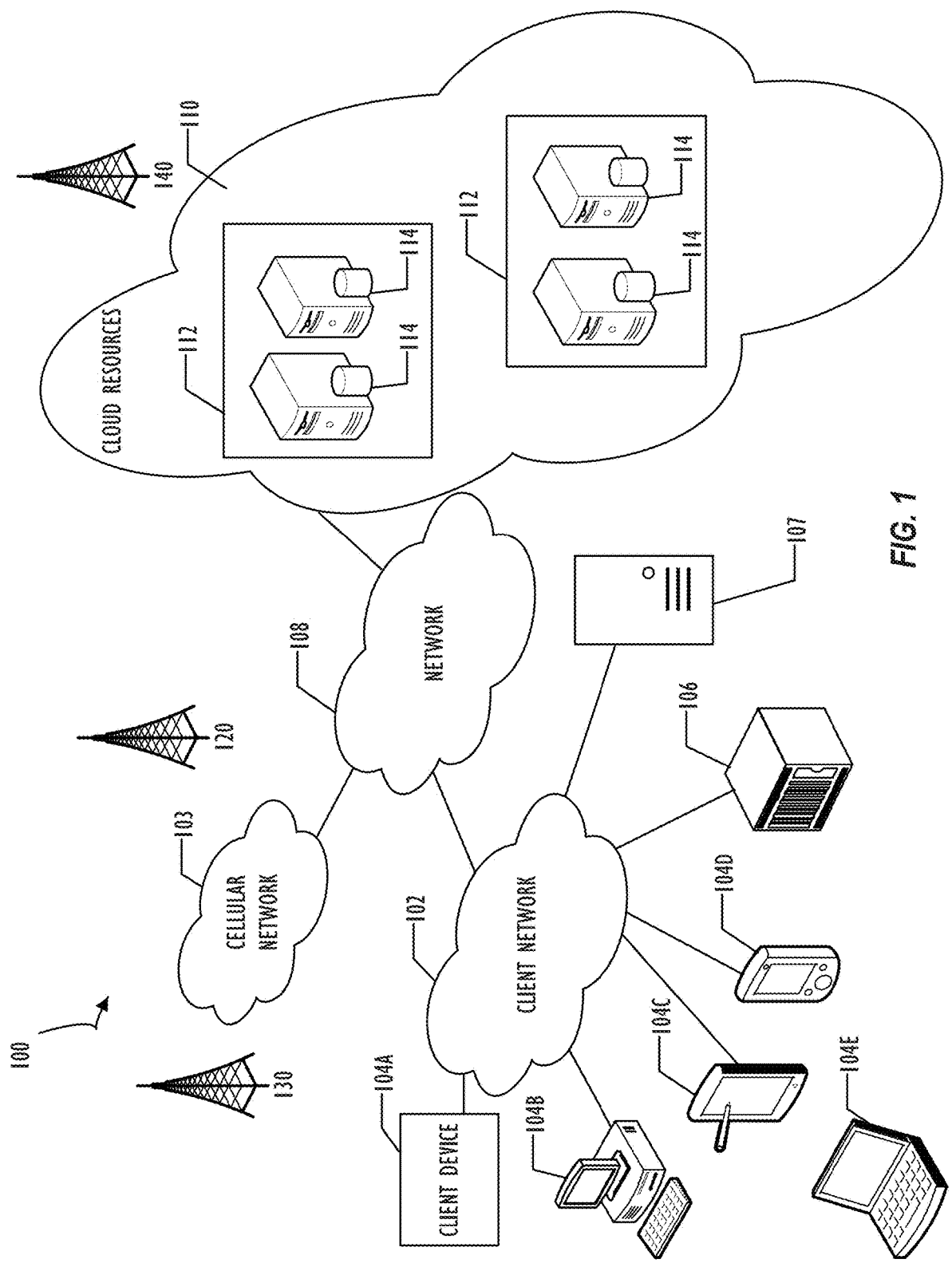
FIG. 1 illustrates a block diagram of cloud computing infrastructure 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

The disclosure pertains to a solution for an enterprise to easily manage end-to-end process of continual improvement of processes, services, or functions of the enterprise. The solution provides a structured approach to manage continual improvement of the various process-level, service-level, or function-level actions of the enterprise, from identifying improvements to value realization, including discovering, identifying, detecting, creating, measuring, planning, changing, improving, and managing improvement opportunities (i.e., optimizations). The solution may leverage capabilities of other existing applications and solutions of the enterprise in managing continual improvement and drive continual improvement at all levels by aligning continual improvement processes or initiatives (CIPs), enterprise data, subject-matter experts, and enterprise objectives and goals to achieve continual improvement of any process, service, or function of the enterprise. Further, the solution may provide visibility into progress data of the CIPs via workbenches that provide simplified access to users and value realization dashboards that provide visibility into outcomes achieved through completion of tasks associated with the CIPs. Techniques disclosed herein enable a user to set measurable goals (i.e., monitored metrics) with predetermined targets for the CIPs; identify and monitor completion of one or more tasks associated with the CIPs; embed real-time analytics and continuously monitor progress data associated with the monitored metrics over time; and take course correction measures depending on the progress data. For example, an improvement KPI with a current base metric and a predetermined target metric to be achieved within a predetermined time period may be set as the monitored metric, and real-time analytical data (e.g., a scorecard widget) associated with the KPI may be embedded into the CIP so the user can track changes to the real-time scorecard of the KPI as tasks associated with the CIP are completed. The user can thus view progress of the monitored metric and determine whether the CIP is on track to achieve the improvement goal. Users may create new CIPs through a variety of integration points in existing applications associated with the enterprise. The CIPs may then be all centrally managed, implemented, and monitored with the solution described herein. Techniques disclosed herein also look to enable a user to identify a service, process or function; analyze and drill-down selected primary and one or more suggested secondary KPIs; and identify new candidates for CIPs based on one or more optimizations newly discovered by the solution described herein.

FIG. 1 illustrates a block diagram of an embodiment of a cloud computing infrastructure 100 where one or more embodiments of the present disclosure may operate. Cloud computing infrastructure 100 comprises a client network 102, network 108, and a cloud resources platform/network 110. In one embodiment, the client network 102 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 102 represents an enterprise network that could include or be communicatively coupled to one or more local area networks (LANs), virtual networks, data centers and/or other remote networks (e.g., 108, 110). As shown in FIG. 1, client network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. FIG. 1 also illustrates that client network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between client network 102 and other networks such as network 108 and cloud resources platform/network 110. Local compute resource 106 may also facilitate communication between other external applications, data sources, and services, and client network 102.

FIG. 1 also illustrates that client network 102 may be connected to a computer configured to execute a management, instrumentation, and discovery (MID) server 107. For example, MID server 107 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-based instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact with other mobile devices or with non-mobile devices such as desktop computer 104B and various types of client device 104A for desired services. Although not specifically illustrated in FIG. 1, client network 102 may also include a dedicated network device (e.g., gateway or router) or a combination of network devices that implement a customer firewall or intrusion protection system.

FIG. 1 illustrates that client network 102 is coupled to a network 108. Network 108 may include one or more computing networks, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via client network 102 and network 108. The cloud resources platform/network 110 acts as a platform that provides additional computing resources to the client devices 104A-E and/or client network 102. For example, by utilizing the cloud resources platform/network 110, users of client devices 104A-E may be able to build and execute applications, such as automated processes for various enterprise, IT, compliance and/or other organization-related functions. These applications may be provided in two or more instances deployed on cloud resources platform/network 110 for users of client devices 104A-E of an enterprise. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form of a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary MySQL® catalog). MySQL is a registered trademark of MySQL AB.

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple client instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 110, and customer-driven upgrade schedules. Multiple client instances may also be deployed for a single customer to further customize upgrade schedules and provide separation different functions or operational units of the customer. An example of implementing a client instance within a multi-instance cloud architecture will be discussed in more detail below when describing FIG. 2.

Figure 2:
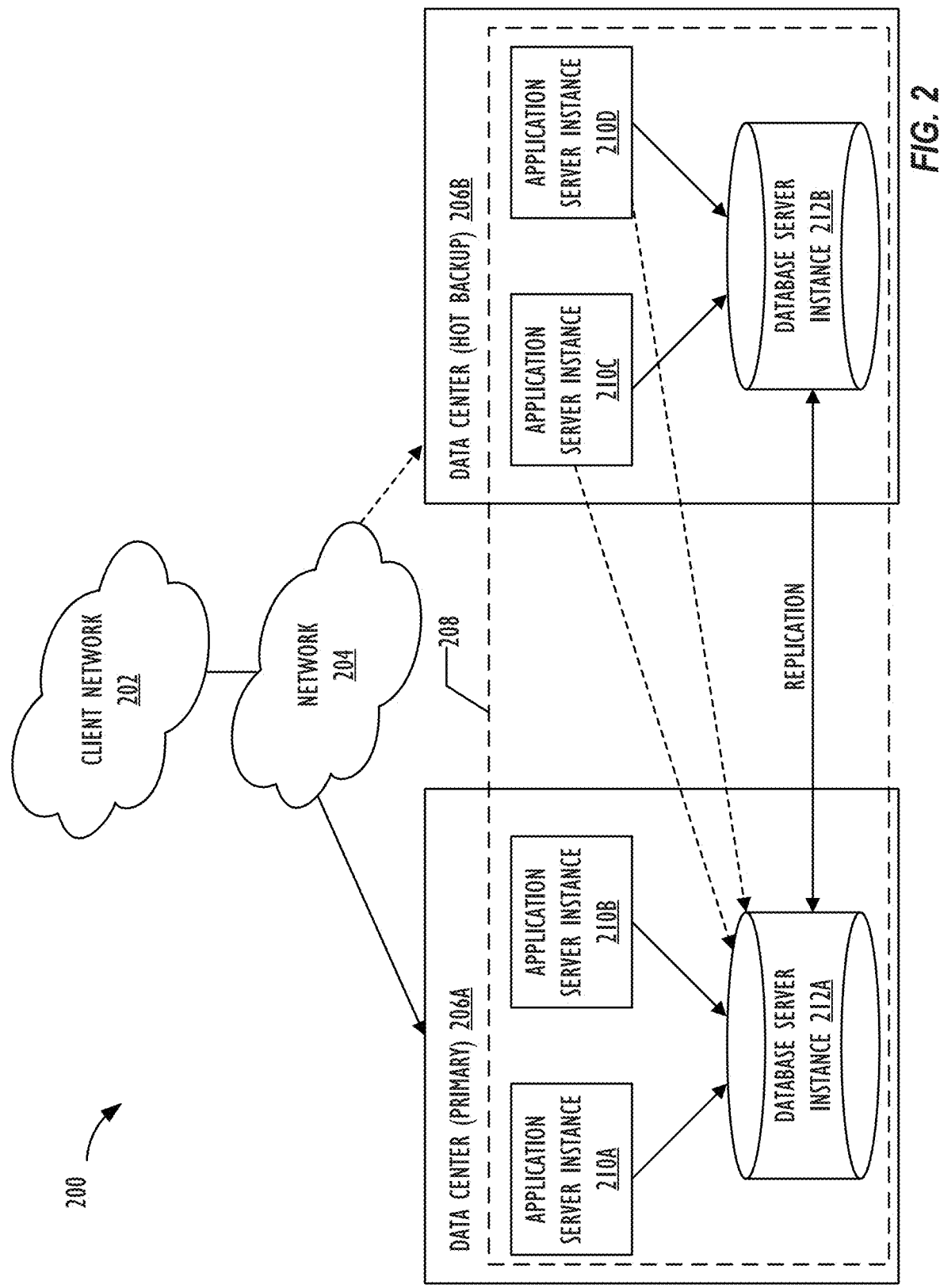
FIG. 2 illustrates a block diagram of multi-instance cloud architecture 200 where one or more embodiments of the present disclosure may operate.

In one embodiment, utilizing a multi-instance cloud architecture, a first client instance may be configured with a client side application interface such as, for example, a web browser executing on a client device (e.g., one of client devices 104A-E of FIG. 1). FIG. 2 illustrates a block diagram of an embodiment of a multi-instance cloud architecture 200 where embodiments of the present disclosure may operate. FIG. 2 illustrates that the multi-instance cloud architecture 200 includes a client network 202 that connects to two data centers 206A and 206B via network 204. Client network 202 and network 204 may be substantially similar to client network 102 and network 108 as described in FIG. 1, respectively. Data centers 206A and 206B can correspond to FIG. 1's data centers 112 located within cloud resources platform/network 110. Using FIG. 2 as an example, a client instance 208 (e.g., a producer instance acting as a source of replication data of an associated replication target table of a replication set, or a consumer instance acting as a consumer of the replication data of the producer instance) is composed of four dedicated application server instances 210A-210D and two dedicated database server instances 212A and 212B. Stated another way, the application server instances 210A-210I and database server instances 212A and 212B are not shared with other client instances 208. Other embodiments of multi-instance cloud architecture 200 could include other types of dedicated server instances, such as a web server instance. For example, client instance 208 could include the four dedicated application server instances 210A-210D, two dedicated database server instances 212A and 2128, and four dedicated web server instances (not shown in FIG. 2).

To facilitate higher availability of client instance 208 application server instances 210A-210D and database server instances 212A and 212B are shown to be allocated to two different data centers 206A and 2068, where one of data centers 206 may act as a backup data center. In reference to FIG. 2 data center 206A acts as a primary data center that includes a primary pair of application server instances 210A and 210B and primary database server instance 212A for client instance 208, and data center 2068 acts as a secondary data center to back up primary data center 206A for client instance 208. To back up primary data center 206A for client instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 2068. Having both a primary data center 206A and secondary data center 206B allows data traffic that typically travels to the primary data center 206A for client instance 208 to be diverted to secondary data center 2068 during a failure and/or maintenance scenario. Using FIG. 2 as an example, if application server instances 210A and 210B and/or primary data server instance 212A fail and/or are under maintenance, data traffic for client instance 208 can be diverted to secondary application server instances 210C and 210D and secondary database server instance 212B for processing.

Although FIGS. 1 and 2 illustrate specific embodiments of cloud computing infrastructure 100 and multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only exemplary to facilitate ease of description and explanation.

Figure 3:
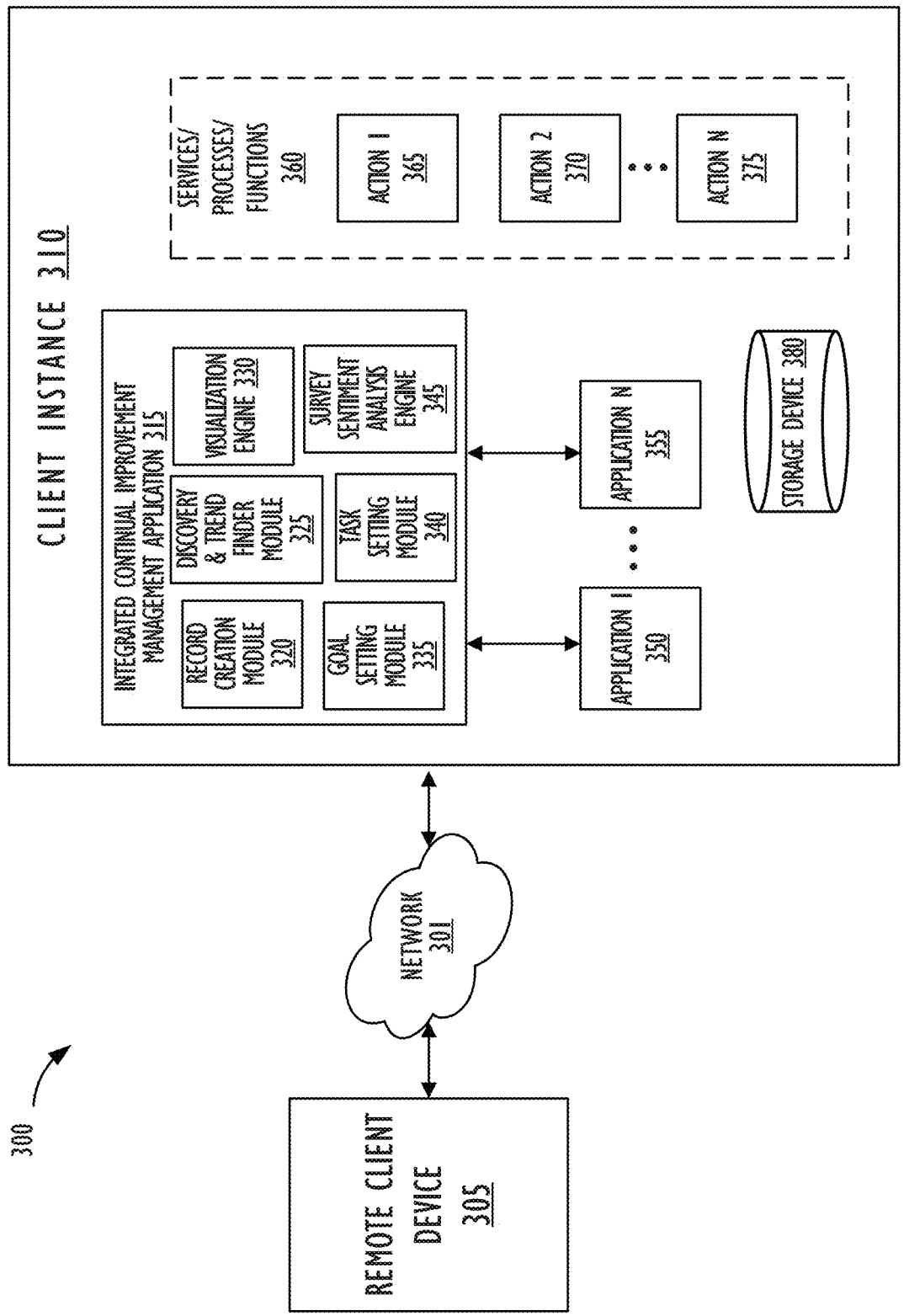
FIG. 3 illustrates a block diagram of continual improvement management (CIM) system 300 where one or more embodiments of the present disclosure may operate.

FIG. 3 illustrates a block diagram of CIM system 300 where one or more embodiments of the present disclosure may operate. As shown in FIG. 3, CIM system 300 may include remote client device 305 and client instance 310 that are communicatively coupled to each other through network 301. Remote client device 305 may be substantially similar to any of client devices 104A-E as described in FIG. 1, and network 301 may be substantially similar to any of client network 102 and network 108 as described in FIG. 1. Detailed description of remote client device 305 and network 301 is omitted here. Client instance 310 may be substantially similar to client instance 208 as described in FIG. 2. Client instance 310 may be hosted on cloud resources platform/network 110 as described in FIG. 1 and may be accessible by a user of remote client device 305 via network 301 through an application interface such as, for example, a web browser executing on remote client device 305, in order to access software applications (i.e., products) deployed on client instance 310. Client instance 310 may include multiple deployed applications including integrated CIM application 315 and one or more additional applications (e.g., application 1 350, . . . , application N 355), and storage device 380. Services/processes/functions 360 associated with client instance 310 may represent various services, processes, or functions of the enterprise that may be provided, managed, accessed, monitored, and the like by users of the enterprise through client instance 310. Services/processes/functions 360 may include services that users of the enterprise may actually use (e.g., email service, backup service) and may need help with from, for example, IT department of the enterprise; processes that may include methods by which the services of the enterprise are delivered to users; and functions that may represent different functions of the enterprise like IT, customer service, Human Resources, product success, and the like.

As shown in FIG. 3, services/processes/functions 360, individually or collectively, may be more generally represented as including one or more actions (e.g., action 1 365, action 2 370, . . . , action N 375). The one or more actions (e.g., action 1 365, action 2 370, . . . , action N 375) may be associated with various applications (e.g., integrated CIM application 315, application 1 350, . . . , application N 355) deployed on client instance 310. The applications (e.g., application 1 350, . . . , application N 355) may include IT security, customer service, and HR related applications and may provide related services (e.g., IT Service Management, Incident Management, Problem Management, Change and Release Management, Benchmarks, Cost Management, Request Management, Configuration Management Database, Asset Management, Service Catalog, Knowledge Management, Survey and Assessment, Service Level Management, IT Operations Management, Discovery, Cloud Management, Event Management, Orchestration, Service Mapping, Operational Intelligence, IT Business Management, Project Portfolio Management, Demand Management, Resource Management, Agile Development, Application Portfolio Management, Cost Transparency, Financial Planning, Financial Reporting, Performance Analytics, Software Asset Management, Security, Security Operations, Governance, Risk and Compliance, Customer Service, Customer Service Management, Field Service Management, Knowledge Management, HR Service Delivery, Case and Knowledge Management, Employee Service Center, Employee Onboarding and Transitions). These exemplary applications and services may be deployed consistent with an industry-standard best-practices framework (e.g., Information Technology Infrastructure Library (ITIL) framework) for delivering IT service management (ITSM). Detailed description of these services is omitted here.

Integrated CIM application 315 may provide an integrated solution for service improvement and management by focusing on increasing efficiency, maximizing effectiveness and optimizing cost of services and underlying service management processes of the enterprise. Integrated CIM application 315 may enable users of client instance 310 to identify improvement opportunities (i.e., optimizations) throughout the entire lifecycle of services/processes/functions 360 associated with client instance 310. Integrated CIM application 315 may also enable the user to continually align and re-align services/processes/functions 360 (e.g., IT services) to changing needs of the enterprise by identifying and implementing improvements in the form of CIPs related to various actions (e.g., action 1 365, action 2 370, . . . , action N 375) associated with client instance 310. CIPs may be processes that have a long-term impact on improving a service, process or function of the enterprise and may include reinforcement measures to make the improvements permanent (i.e., avoid rollbacks). To illustrate, CIPs may include monitored metrics with predetermined targets to, for example, reduce incident backlog; identify automation candidates; increase customer satisfaction; increase service availability; decrease time to resolve incidents; increase accuracy of service provided; deflect low priority incidents by automation; increase requester to fulfiller ratio; improve consumption of key services; provide coaching opportunities; fill process gaps; and the like.

Integrated CIM application 315 may be coupled to applications (e.g., application 1 350, . . . , application N 355) deployed on client instance 310 to access various features provided by these applications or to obtain data. For example, integrated CIM application 315 may be coupled to a Benchmarks application that provides a comparison of service management performance of various indicators of the enterprise associated with client instance 310 to corresponding industry averages of peers for analysis and optimization of performance of the enterprise. As another example, integrated CIM application 315 may be coupled to a surveys and assessments application that measures experience and expectations of users, customers, staff, and the like by creating clear and relevant internal or public surveys, collecting responses, and automatically analyzing and publishing or sharing the results. As another example, integrated CIM application 315 may be coupled to a performance analytics (PA) application that provides support services involving automating the process of extracting insights and generating reports based on a continuous stream of real-time analytical data to enable stakeholders to improve service management in real-time. The PA application may uncover trends with real-time actionable insights so that users of client instance 310 can visualize areas for performance improvement and take immediate action before poor performance impacts the enterprise. Thus, the PA application may allow an enterprise to respond faster to requests and prevent growing service backlogs across all departments of the enterprise by providing an accurate perspective on all areas of service delivery. The PA application may visualize analytical data of various indicators using a variety of visualizations. For example, the PA application may render dashboards, scorecards, widgets and other visualizations and set and store targets, thresholds, trendlines, and useful comments with respect to data of the enterprise. As another example, integrated CIM application 315 may be coupled to a project portfolio management (PPM) application that provides visibility into all demand, resources, and project portfolios to better align efforts with enterprise strategy and enhance resource allocation across every project.

Integrated CIM application 315 may include, among other components that are not shown in FIG. 3, record creation module 320, discovery and trend finder module 325, visualization engine 330, goal setting module 335, task setting module 340, and survey sentiment analysis engine 345. Each component of integrated CIM application 315 shown in FIG. 3 and described below is further described in more detail in connection with FIGS. 4-10. Record creation module 320 may enable users to create records of respective CIPs to improve or optimize one or more actions (e.g., action 1 365, action 2 370, . . . , action N 375) associated with client instance 310. Discovery and trend finder module 325 enables users to discover new CIP candidates or optimizations for continual improvement and outputs the candidates for consideration by the users based on identification of a service, process or function of the enterprise as a target area for improvement. The user may analyze and drill-down indicator and breakdown data that is associated with one or more KPIs in the target area and that is presented by discovery and trend finder module 325 to identify drivers and discover new optimizations for improvement as new CIPs candidates for which one or more records may be created. In one embodiment, discovery and trend finder module 325 may automatically discover the new CIPs candidates based on identification of the target area for improvement by a user.

KPIs or indicators (also known enterprise metrics) are a type of performance measurement used by enterprises to measure current conditions and forecast future trends. Indicators are commonly used to evaluate success or the success of a particular activity. Success may be defined as making progress toward strategic goals, or as the repeated achievement of some level of operational goal (e.g., zero defects, or 10/10 customer satisfaction). Indicators may be associated with performance improvement processes such as the CIPs of integrated CIM application 315. Scores associated with indicators are usually presented in graphs to make them easier to read and understand. Breakdowns (also known as dimensions or drill-downs) divide data of indicators in different ways. For example, incident data of a number of open incidents indicator can be divided by breakdowns including priority, category, assignment group, state or age. Client instance 310 may provide "out of the box" indicators and breakdowns that may be utilized by applications (e.g., Benchmarks application, PA application, integrated CIM application 315) deployed on client instance 310. In addition, the user of client instance 310 may create additional KPIs using existing indicators or other analytical data (e.g., survey and assessment data, external analytical data) associated with client instance 310.

Discovery and trend finder module 325 may further include techniques to set a threshold associated with an action (e.g., action 1 365, action 2 370, . . . , action N 375) being monitored as a potential CIPs candidate monitor trend data (e.g., indicator data of a scorecard) associated with the action to determine whether the set threshold is breached; and present the action to a user for creation of a new CIP based on the breached threshold of the action. In one embodiment, discovery and trend finder module 325 may automatically submit requests for creation of new CIPs based on the breached thresholds without any user operation.

Figure 10:
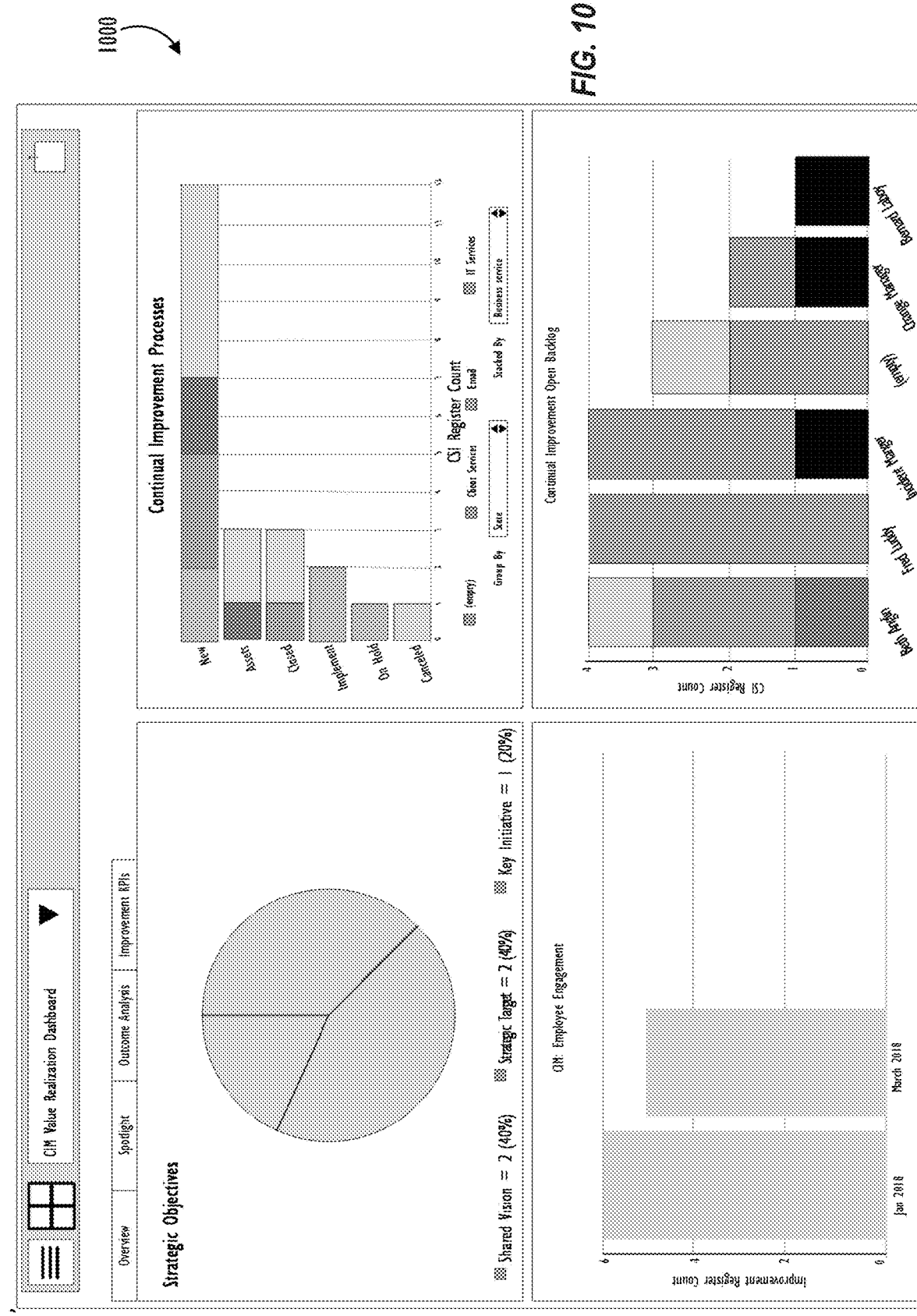
FIG. 10 shows a screen shot of GUI 1000 illustrating a value realization dashboard providing visibility into outcomes achieved through the CIPs in accordance with one or more embodiments.

Visualization engine 330 may include logic for visualizing data for presentation to the user. For example, visualization engine 330 may visualize analytical data (e.g., KPI data, survey and assessment data or external analytical data) using a variety of visualizations including dashboards, scorecards, widgets and other visualizations. In order to get full benefits from integrated CIM application 315 and the PA application, visualization engine 330 may render dashboards, scorecards, widgets and other visualizations using real-time analytical data associated with PA or benchmark indicators and breakdowns stored in storage device 380. Visualization engine 330 may include logic to visualize integrated CIM application 315 at the front end. For example, visualization engine 330 may include logic to visualize indicators, scorecards, dashboards, workbenches, and/or widgets on a client device. Scorecards refer to a graphical visualization of the scores of an indicator. Scorecards can be enhanced by adding targets, thresholds, trendlines, and useful comments for significant changes. In a scorecard, the scores of an indicator may be analyzed further by viewing the scores by breakdowns (scores per group), aggregates (counts, sums, and maximums), time series (totals and averages applied to different time periods) and (if available) drilling down to the records on which the scores are based. Workbenches may refer to a graphical interface that allows users to interact with different applications deployed on client instance 310. Different workbenches may have different characteristics. Dashboards may refer to a visualization (e.g., collection of lists, graphs, charts, or other content items that automatically refresh) presented to a user of client instance 310 based on CIM data. (See FIGS. 9-10 illustrating presented progress data including CIM workbench and CIM value realization dashboard. FIGS. 9-10 are explained in detail later). A dashboard may have multiple tabs to analyze and interact with visualizations of indicator scores, called widgets. Each tab of the dashboard may hold one or more widgets. A user may have one or more dashboards assigned for viewing. Widgets determine how data is presented on dashboards and are visible only when added to a dashboard. Widgets allow visualizations of multiple indicators on a single dashboard in order to visualize multiple score sources. A widget can be configured to have different visualization types to display data as a time series, score, list, or breakdown. For example, a widget can be configured as a chart, latest score, speedometer, dial, scorecard, or column.

Goal setting module 335 may enable user to set a monitored metric with a predetermined target corresponding to the record created by record creation module 320. Goal setting module 335 may measure the monitored metric based on analytical data associated with the metric. The analytical data may be obtained from an application (e.g., application 1 350, . . . , application N 355) or from another source and may include PA data, survey and assessment data or analytical data from an external source external to client instance 310. In one embodiment, when goal setting module 335 sets a PA or benchmark KPI as a monitored metric, goal setting module 335 may embed real-time analytical data of, for example, a scorecard widget of the KPI in the record associated with the monitored metric and visualization engine 330 may present the scorecard widget of the KPI in association with the monitored metric on a dashboard to the user. Task setting module 340 may enable a user to set one or more identified tasks to be performed to achieve the monitored metric. In one embodiment, task setting module 340 may enable a user to identify the tasks associated with a CIP by dynamically creating a workbench including analytical data of a primacy indicator associated with the monitored metric and one or more impacted indicators. Alternately, task setting module 340 may automatically identify and recommend tasks associated with a CIP record by analyzing current system data, and historical data of the monitored metric, and determining likely drivers that should be acted on to improve a particular action (e.g., KPI, or customer satisfaction score). Survey sentiment analysis engine 345 may include logic for performing sentiment analysis on survey and assessment data to determine sentiments (e.g., positive, negative, neutral) of feedback survey responses from customers or users of the enterprise associated with client instance 310.

Storage device 380 of client instance 310 may be a relational database storing proprietary data associated with client instance 310. For example, storage device 380 may store record data of records created for new CIPs by record creation module 320. Further storage device 380 may store analytical data including indicator and breakdown data of plural KPIs, survey and assessment data of customer surveys, and external analytical data that is obtained from an analytical stack external to client instance 310. For example, the external analytical data may be proprietary analytics data generated from an external analytic stack that is not hosted on client instance 310. The data may be imported into client instance 310 for implementing, tracking, monitoring and managing CIPs based on the external analytical data.

Figure 4A:
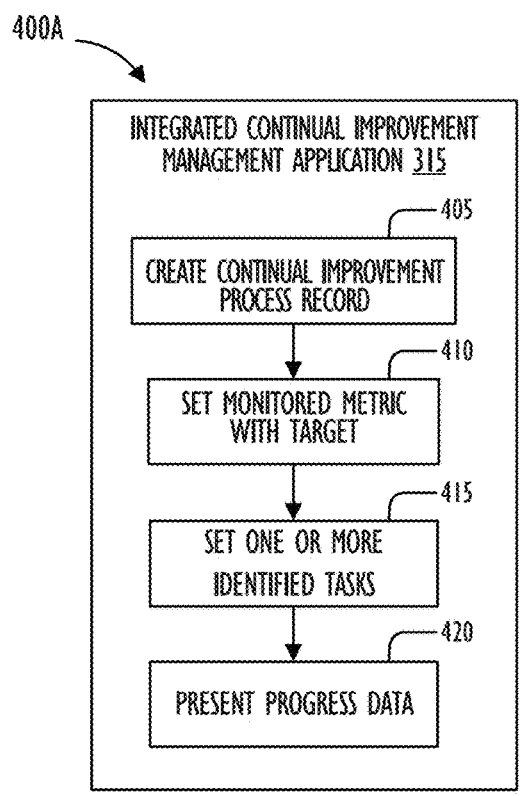
FIG. 4A shows flowchart 400A illustrating operations of integrated CIM application 315 of FIG. 3 for creating a record of a continual improvement process (CIP) and measuring progress of the CIP in accordance with one or more disclosed embodiments.

FIG. 4A shows flowchart 400A illustrating operations of integrated CIM application 315 of FIG. 3 for creating a record of a CIP and measuring progress of the CIP in accordance with one or more disclosed embodiments. Flowchart 400A begins at block 405 with creation of a record of a CIP associated with a particular action that is to be improved or optimized. The record may be created by record creation module 320 responsive to an operation of a user. The record may be created responsive to a user operation at any of a plurality of integration points corresponding to a plurality of applications (e.g., application 1 350, . . . , application N 355) deployed on client instance 310. Exemplary integration points may include: an integration point in the Benchmarks application when a best practice recommendation to improve a KPI against the peer benchmark involves creating a new CIP (or changing an existing CIP) to improve the benchmark KPI score; an integration point in the Survey and Assessment application to create a new CIP or change an existing CIP when a customer satisfaction survey score is determined to be low; an integration point in the PA application to create/change a CIP when a user (or a system) determines a given KPI score to be outside an acceptable range; an integration point in the PPM application to create/change a CIP responsive to an idea/demand request, an integration point in integrated CIM application 315 to create/change a CIP responsive to discovery of new CIP candidates by discovery and trend finder module 325. Alternately, the CIP record may be directly created manually by the user in integrated CIM application 315 in one embodiment, the record may be automatically created (or a request to create the record submitted) at block 405 without user input by discovery and trend finder module 325 responsive to discovery of new optimization candidates for creating new CIPs in a target area specified by a user or responsive to a set threshold of an action being breached. The record may be submitted for creation by different users (e.g., process owners, service managers, helpdesk managers, IT staff, analysts, development or project managers, management staff) and may be subject to review, prioritization and approval by other users (e.g., relevant stakeholders) of client instance 310 prior to being implemented. The review, prioritization and approval of the CIPs may be based on whether the CIP aligns with predetermined high level strategic objectives or goals of the enterprise.

Figure 5:
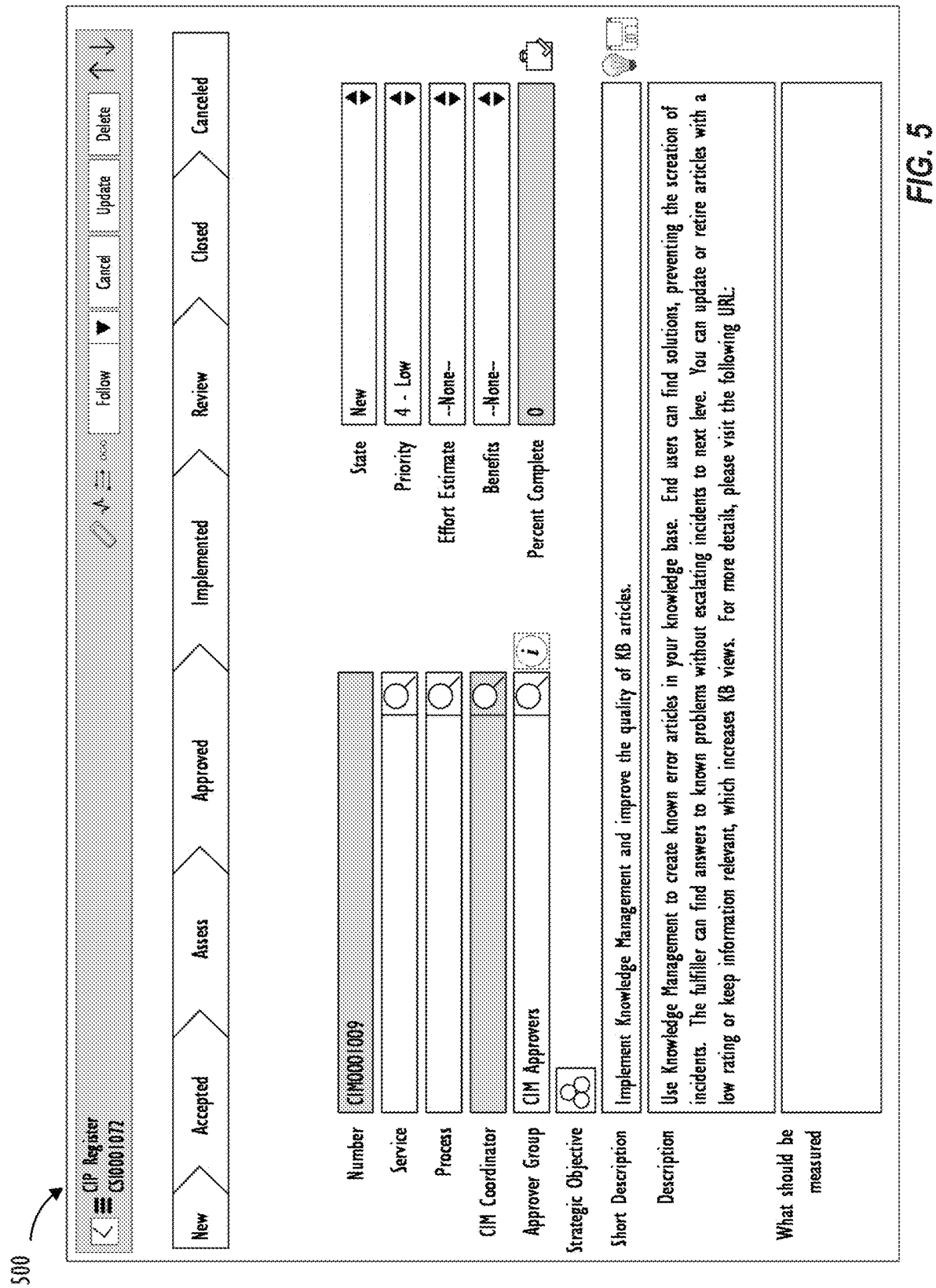
FIG. 5 shows an illustrative screen shot of graphical user interface (GUI) 500 for creating a record of a CIP in accordance with one or more embodiments.

FIG. 5 shows an illustrative screen shot of graphical user interface (GUI) 500 for creating a record of a CIP in accordance with one or more embodiments. The record may be created by a user operation at an integration point corresponding to one of the deployed applications of client instance 310. For example, when a given KPI on the Benchmark application dashboard is below the corresponding baseline, a user of client instance 310 may accept a best practice recommendation provided by the Benchmark application to create a new CIP for improving the score of the KPI. Responsive to the user operation, as illustrated in FIG. 5, a new record for the CIP may be created in a CIP register and a fillable form may be presented to the user for setting field values of the record of the CIP associated with the benchmark KPI. The CIP register may correspond to one or more tables in storage device 380 and may store all CIPs, and associated data and activities (e.g., tasks) and their outcomes. As shown in FIG. 5, record creation module 320 may pre-fill certain fields (e.g., Short Description, and Description fields) based on, for example, data of the benchmark KPI from the Benchmark application. The user may also enter additional data on the form (e.g., 'service', 'process', 'what should be measured', 'State', 'Priority') prior to submitting the form for review and assessment. The relevant stakeholder (e.g., improvement manager) may then review the CIP record and set priority and approve of the CIP based on whether the CIP aligns with high level strategic objectives or goals of the enterprise. Thus, the stakeholder may reject (or assign low priority to) the CIP if the CIP is determined to not be in alignment. The stakeholder may further enter additional data on the form (e.g., 'CIM coordinator', 'Approver Group', 'Strategic Objective', 'Priority', 'Benefits'), and assign the CIP to relevant subject-matter expert for implementation. Thus, an optimization for continual improvement may be submitted by a user from any application on client instance 310 and creation of the CIPs may be carried out in a structured manner and managed centrally from integrated CIM application 315.

Returning to FIG. 4A, at block 410, goal setting module 335 may enable a user to set a monitored metric with a predetermined target corresponding to the CIP that has been approved for implementation by the stakeholder. The monitored metric may measure progress of the CIP over time based on analytical data associated with the monitored metric. The analytical data may be KPI data, survey and assessment data, or external analytical data. FIG. 6 shows an illustrative screen shot of GUI 600 for setting a monitored metric with a predetermined target in accordance with one or more embodiments. In cases where improvement of the action (i.e., service/process/function 360), that is to be improved and that is associated with the record of the CIP created at block 405, is to be tracked using a KPI or breakdown of the KPI, and analytical data of the KPI is available for consumption to integrated CIM application 315 (e.g., from PA application on client instance 310), the user may decide to set the KPI as the monitored metric and the score of the KPI as the predetermined target. Thus, for example, as shown in FIG. 6, the user may specify 'Automated: PA indicator' as the 'Progress Measurement Method' for the monitored metric and select a KPI (Incident Backlog Growth') as an 'Improvement KPI' whose metric is to be tracked for progress measurement of the CIP record. Goal setting module 335 may further enable the user to set breakdowns and elements associated with the Improvement KPI to narrow the scope of the monitored metric based on the action to be improved or optimized. As shown in GUI 600 of FIG. 6, the user may further enter (or goal setting module 335 may automatically set) current base metric and predetermined target metric to be achieved within a predetermined time period associated with the Improvement KPI (e.g., 'Base Value', 'Target Value', 'Target Review Date', and 'Expected Outcomes'). In cases where improvement or optimization of the action is to be tracked using survey and assessment data or external analytical data, the user may specify 'Survey and Assessments' or 'Manual' as the 'Progress Measurement Method', respectively, in GUI 600 shown in FIG. 6. Survey and assessment data may include feedback data for the enterprise on a survey and assessment topic, for example, customer satisfaction, service quality, and the like. The current base metric and predetermined target metric to be achieved within the predetermined time period in case of survey and assessment data being the 'Progress Measurement Method' may be based on a PA indicator that is built on top of the response data of a survey or assessment that is conducted before implementation of the CIP and also after completion of one or more tasks associated with the CIP. Further, the current base metric and predetermined target metric to be achieved within the predetermined time period in case of external analytical data being the 'Progress Measurement Method' may be based on metrics on a manual topic that are manually specified by the user and that are sourced from an analytical stack external to client instance 310.

At block 410, when the monitored metric is based on survey and assessment data, survey sentiment analysis engine 345 may apply sentiment analysis on text-based survey responses of a survey or assessment by using a commercially available sentiment analysis application programming interface (API) (e.g., IBM® Watson®, Google® Cloud Platform Natural Language). IBM is a registered trademark of International Business Machines Corporation. Google is a registered trademark of Google, Inc. Sentiment analysis may be performed on text feedback data included in survey or assessment responses from users or customers of client instance 310 to determine sentiments (e.g., positive, negative, neutral) of the survey responses. Sentiment scores returned by the APIs may be normalized by survey sentiment analysis engine 345. A metric based on the number of responses with positive sentiments out of the total responses of the survey and assessment data may be set as the current base metric of the monitored metric and the predetermined target metric to be achieved within the predetermined time period may be a metric based on the number of responses with positive sentiments out of the total responses to a survey conducted again after the identified tasks of the CIP are implemented or completed. Visualization engine 330 may visualize sentiment analysis data (survey and assessment data) of the monitored metric using a variety of visualizations including indicators, breakdowns, widgets, dashboards, workbenches, charts, report cards and the like.

Figure 7:
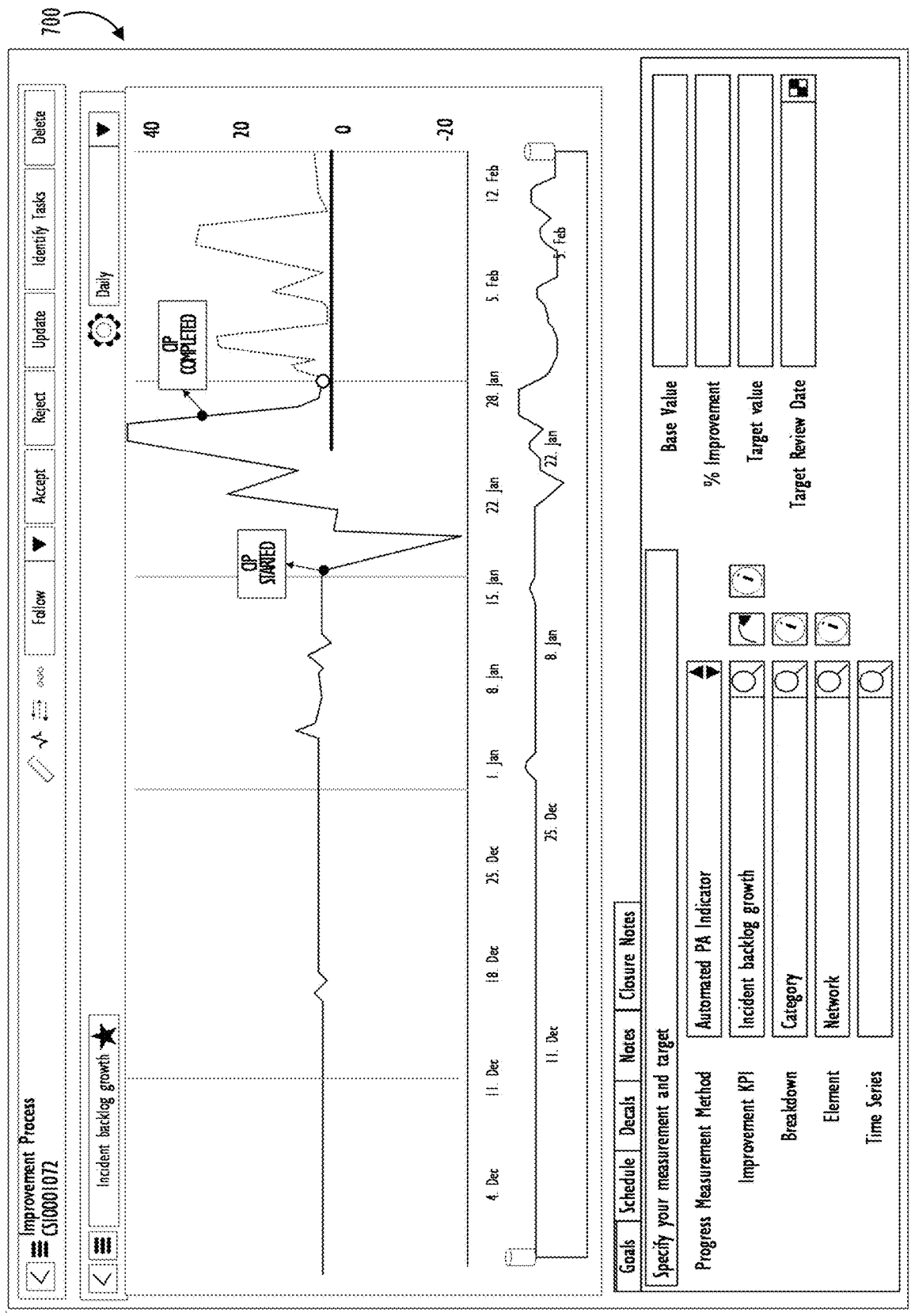
FIG. 7 shows a screen shot of GUI 700 illustrating embedded visualization data associated with an improvement key performance indicator (KPI) in accordance with one or more embodiments.

FIG. 7 shows a screen shot of GUI 700 illustrating embedded visualization data associated with a KPI as a monitored metric in accordance with one or more embodiments. As shown in FIG. 7, when the user specifies a KPI (e.g., Incident backlog growth) as a monitored metric, goal setting module 335 may embed real-time analytical data of, for example, a scorecard widget of the KPI in CIM form list/view of the record associated with the monitored metric set at block 410 and visualization engine 330 may present the scorecard widget of the KPI in association with the monitored metric within the form to the user. This makes it easy for the user to view historical performance data of the KPI (e.g., Incident backlog growth) associated with the monitored metric, and view a forecast of future performance data associated with the KPI which shows how the KPI score is expected to trend under current conditions (i.e., if the CIP were not implemented). Further, once the user sets the current base metric and predetermined target metric to be achieved within the predetermined time period, and as the identified tasks of the CIP are completed, the user can easily view progress of the monitored metric and determine whether the target will be achieved based on whether the KPI score shown in the scorecard widget in real-time is moving toward its target value by the target review data. The user can thus easily determine whether course correction measures (e.g., additional CIPs or tasks) need to be implemented. As shown in GUI 700 of FIG. 7, markers may be added on the trendline of the scorecard widget of the KPI to indicate when the CIP was started and when the CIP (and associated tasks) were completed so that the user may easily determine Whether the CIP has achieved intended results.

Figure 8:
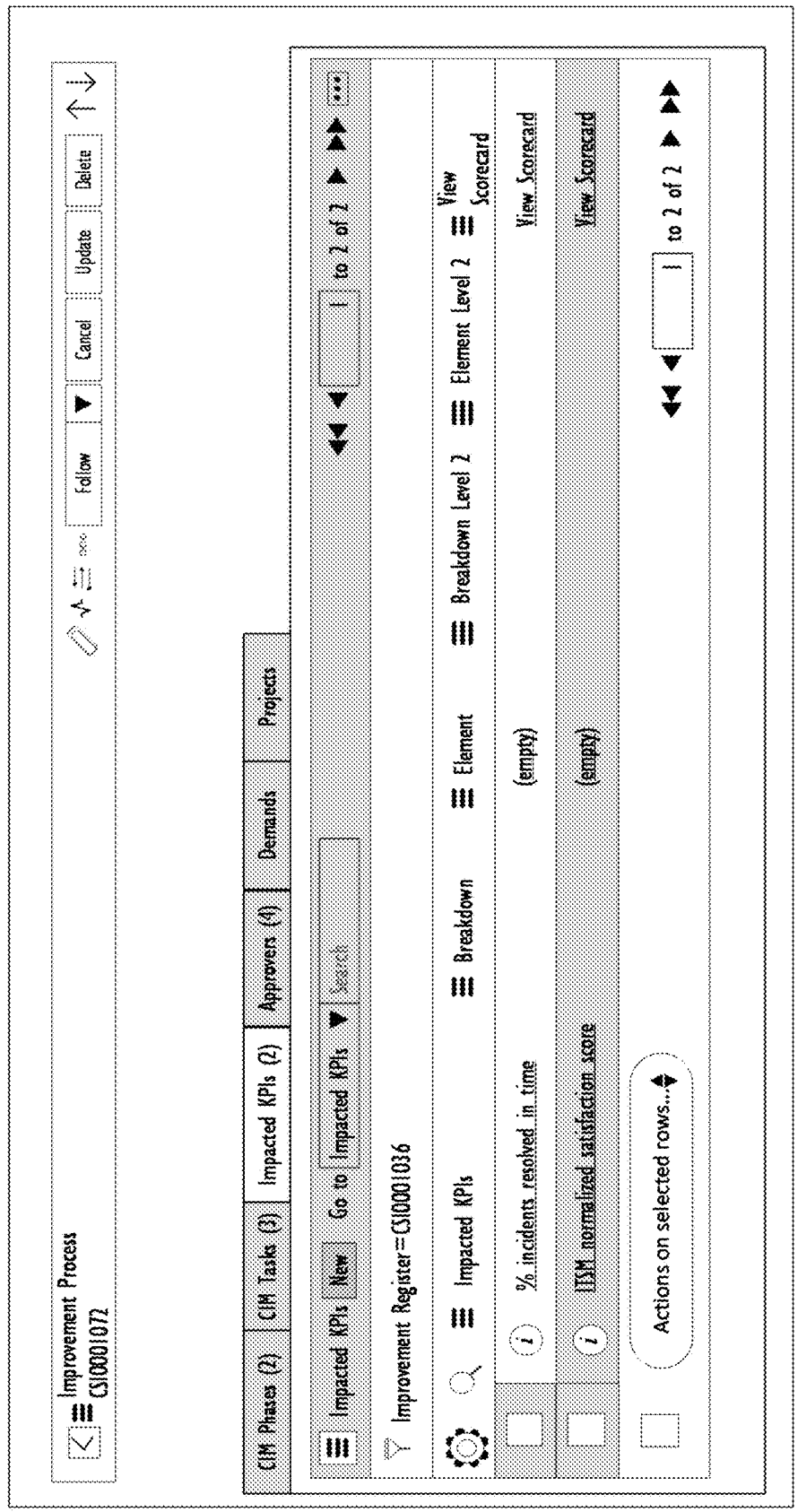
FIG. 8 shows a screen shot of GUI 800 illustrating impacted KPIs associated with an improvement KPI in accordance with one or more embodiments.

FIG. 8 shows a screen shot of GUI 800 illustrating impacted KPIs associated with the KPI identified as monitored metric in accordance with one or more embodiments. When the monitored metric is based on a KPI (e.g., Improvement KPI or survey and assessment KPI), goal setting module 335 may enable the user to set (or goal setting module 335 may automatically set) one or more impacted KPIs in association with the primary monitored metric KPI of the CIP record. The impacted KPIs may include indicators that have an impact on the primary KPI score or vice-versa. In one embodiment, goal setting module 335 may automatically set the impacted KPIs associated to the primary KPI based on data of various interdependencies and regressions between different KPIs and associated the processes, services, or functions. By associating the impacted KPIs to the primary KPI, when monitoring improvement of the monitored metric primary KPI of the CIP, the user may easily monitor impact on scores of other KPIs to ensure that improvement in one process or service related to the primary KPI does not lead to a decline in another process or service related to the impacted KPIs. This breaks conventional disjointed improvement process silos where improvements or optimizations are made without regard for interdependencies and regressions, and enables integrated CIM application 315 to provide a cohesive CIM platform where wholesome and prioritized continual improvement is achieved while being aligned with high level goals and objectives of the enterprise.

Returning to FIG. 4A, at block 415, task setting module 340 may enable a user to set one or more identified tasks corresponding to the CIP that has been approved for implementation by the stakeholder. In case of a KPI based monitored metric, task setting module 340 may identify primary and impacted indicators and breakdowns and visualization engine 330 may present a dashboard of the identified indicators to the user. The user may then analyze the presented data to easily identify tasks to be performed to improve the primary monitored metric KPI. In one embodiment, task setting module 340 may automatically identify and recommend tasks at block 415 by conducting a root cause analysis based on current system data and historical data associated with the monitored metric, and determining likely drivers to be acted on for improvement. Once the CIP is implemented and associated tasks are identified, integrated CIM application 315 may enable stakeholders to assign the tasks to appropriate subject-matter experts and manage timely completion of the tasks, to make progress toward achieving the monitored metric within the predetermined time period. Integrated CIM application 315 may also enable stakeholders to determine in real-time whether, as the tasks are completed, progress is being made toward achieving the monitored metric as indicated by, for example, the scorecard widget of the KPI associated with the CIP record. The real-time feedback may also enable stakeholders to take course correction measures if progress is not being made toward achieving the monitored metric within the predetermined time period despite completion of the identified tasks. In one embodiment, integrated CIM application. 315 may automatically take (or indicate a user to take) course correction measures if progress is not being made toward achieving the monitored metric within the predetermined time period despite completion of the identified tasks.

At block 420, visualization engine 330 may present progress data to the user. The progress data may include a visualization showing what percentage of the CIP has been completed. The percentage value may be based on how many identified tasks of the total number of identified tasks associated with the CIP have been completed. Further, the progress data may include indicators, scorecards, dashboards, workbenches, and/or widgets showing details and progress of one or more CIPs currently under implementation. Exemplary progress data presented to the user is illustrated in FIGS. 9 and 10.

FIG. 9 shows a screen shot of GUI 900 illustrating a workbench presenting progress data of a plurality of CIPs under implementation to a user in accordance with one or more embodiments. Visualization engine 330 may generate GUI 900 based on data of CIPs currently under implementation by integrated CIM application 315, thereby providing an integrated view for relevant stakeholders to easily determine CIPs currently under implementation; view progress data; and manage, prioritize or change one or more of the CIPs based on high level goals and objectives of the enterprise from an integrated platform. As also shown in FIG. 9, GUI 900 may also show a centralized list of CIP requests submitted by various users from all areas of the enterprise for creation and implementation, thereby easily allowing stakeholders to review the CIP requests and determine whether to implement them.

FIG. 10 shows a screen shot of GUI 1000 illustrating a value realization dashboard providing visibility into outcomes achieved through the CIPs in accordance with one or more embodiments. Visualization engine 330 may generate GUI 1000 based on data of CIPs to enable stakeholders to visualize how the CIPs align with the high level objectives and goals of the enterprise; current status of the various CIPs; and the service, process or function of the enterprise associated with each CIP, and the like.

Figure 4C:
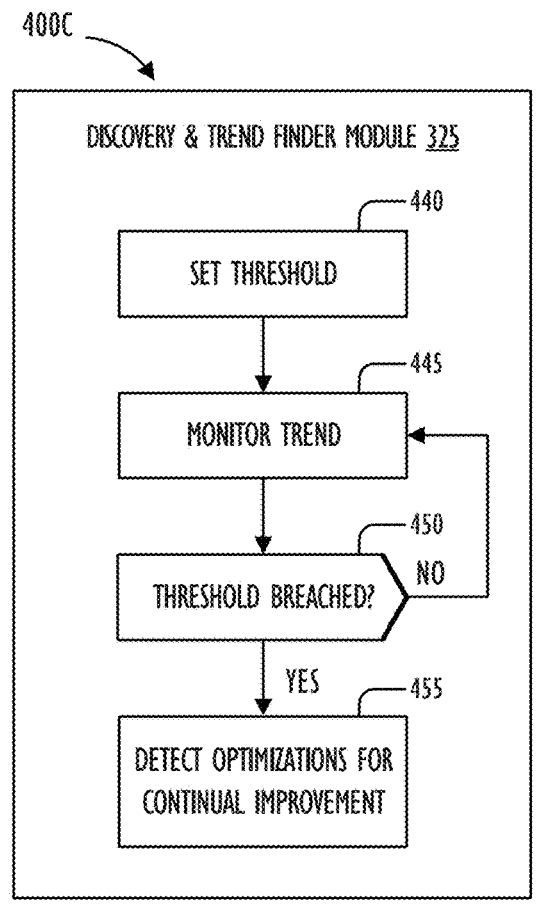
FIGS. 4B-4C show flowcharts 400B and 400C respectively illustrating operations of discovery and trend finder module 325 of FIG. 3 for discovering and automatically detecting new continual improvement opportunities (or optimizations) in accordance with one or more disclosed embodiments.
Figure 4B:
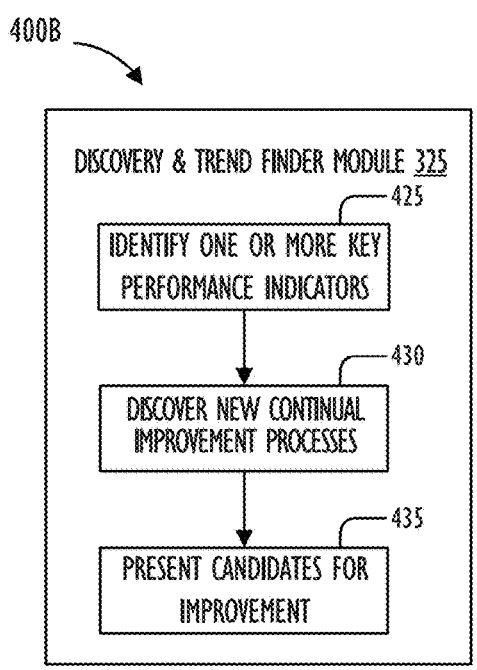

FIG. 4B shows flowchart 400B illustrating operations of discovery and trend finder module 325 of FIG. 3 for discovering new optimizations for continual improvement in accordance with one or more disclosed embodiments. Flowchart 400B begins at block 425 with discovery and trend finder module 325 identifying one or more KPIs for discovery. Users of client instance 310 may be unaware of what CIPs to implement to achieve continual improvement using integrated CIM application 315. The users may rely on discovery and trend finder module 325 of integrated CIM application 315 to discover new CIPs to implement. In one embodiment, discovery and trend finder module 325 may enable the user may identify a process, service or function (i.e., improvement area) of the enterprise where optimization discovery is desired. Based on the identified improvement area, discovery and trend finder module 325 may identify and present one or more KPIs (e.g., leading/lagging KPIs) for analysis. In one embodiment, discovery and trend finder module 325 may further enable the user to select, from the identified KPIs, a primary KPI and based on the primary KPI, discovery and trend finder module 325 may further suggest one or more supporting KPIs and dynamically create a dashboard including the primary and supporting KPIs for analysis by the user. Discovery and trend finder module 325 may thus enable the user to analyze relevant KPIs; 'slice and dice' associated analytical data (historical data and trend data) of the KPIs by dividing the analytical data in different ways based on drill-down and breakdowns; and identify those areas where improvement may be desired, thereby discovering candidates (e.g., problems, process gaps, coaching opportunities) for new CIPs (block 430). At block 430, discovery and trend finder module 325 may also automatically discover and recommend new CIP candidates in the improvement area specified by the user based on predetermined criteria (e.g., benchmarks, PA KPI historical data, other existing CIPs, high level objectives and goals of the enterprise). At block 435, visualization engine 330 may present the newly discovered candidate CIPs to the user for submitting a request to create corresponding records in the CIP register by record creation module 320 and subsequent assessment and review by relevant stakeholders. In one embodiment, discovery and trend finder module 325 may perform the automatic discovery and recommendation of new CIP candidates for one or more predetermined improvement areas on a regular (or aperiodic) basis thereby achieving continual improvement without the need to hire consultants to analyze data of the enterprise.

FIG. 4C shows flowchart 400C illustrating operations of discovery and trend finder module 325 of FIG. 3 for automatically detecting new optimizations for continual improvement in accordance with one or more disclosed embodiments. Flowchart 400C begins at block 440 with discovery and trend finder module 325 setting a measurable threshold for an action that is being monitored as a candidate for optimization. Discovery and trend finder module 325 may enable the user to set one or more actions whose monitored metric (e.g., benchmark, PA or survey and assessment KPI) is to be monitored and further set a measurable threshold associated with each of the one or more actions. At block 445, discovery and trend finder module 325 may monitor the set threshold of the action based on trend data (analytical data of the action (e.g., KPI data)) to determine whether the threshold is breached. For example, discovery and trend finder module 325 may monitor a KPI score to detect when the score of the KPI falls below a particular set threshold value. When discovery and trend finder module 325 determines that the threshold is not breached (NO at block 450), discovery and trend finder module 325 may continue to monitor the trend data of the action with the set threshold. On the other hand, when discovery and trend finder module 325 determines that the threshold is breached (YES at block 450), discovery and trend finder module 325 may automatically detect the action as a new CIP candidate (block 455) and cause record creation module 320 to automatically submit a request to create a record for the new CIP in the CIP register. Discovery and trend finder module 325 may also cause goal setting module 335 to set a monitored metric and associated data for the newly created CIP record based on, for example, the KPI whose threshold breach triggered the creation of the new CIP record. At block 455, discovery and trend finder module 325 may also identify the detected optimization as a CIP candidate and indicate the optimization to a user for consideration and determination regarding whether to submit the request to create the new CIP record.

Figure 11:
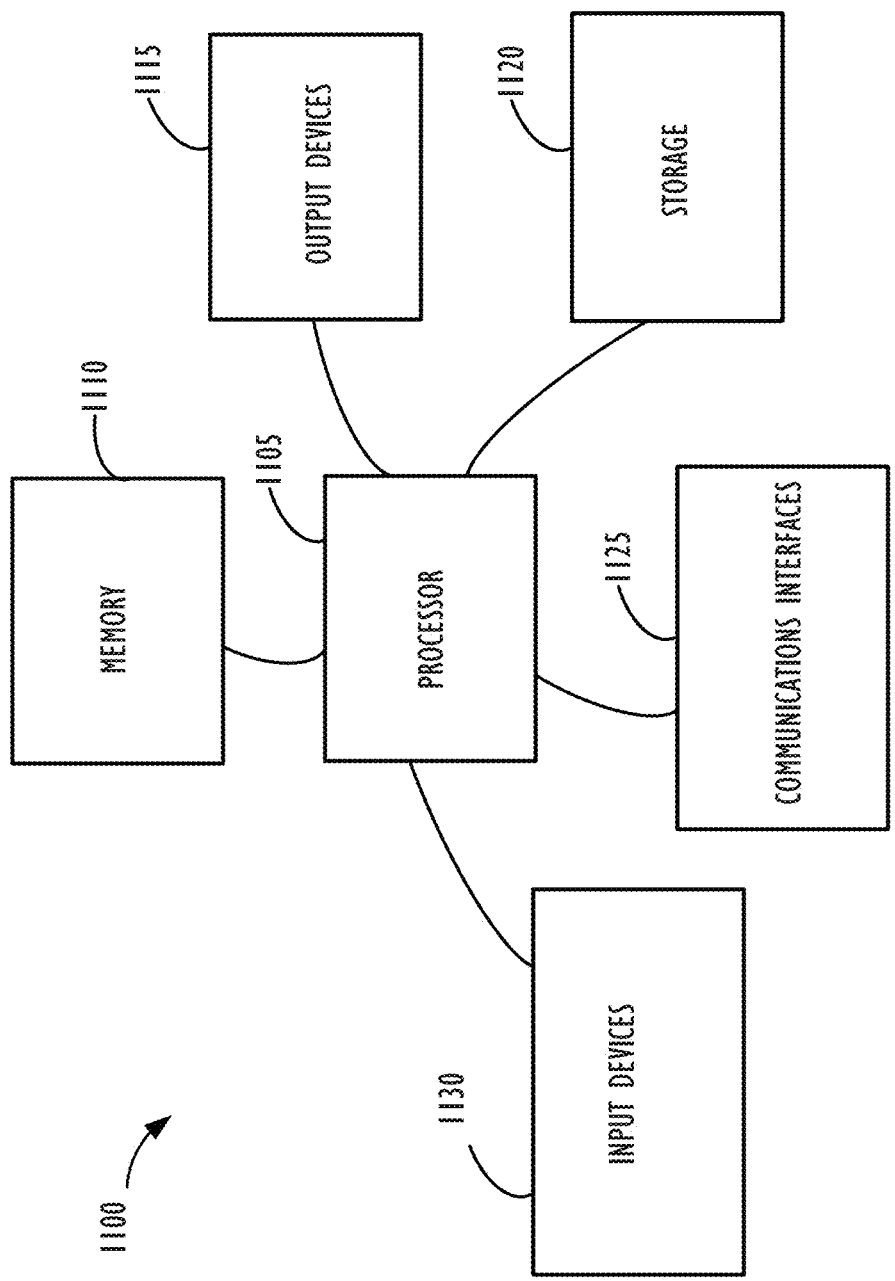
FIG. 11 illustrates a high-level block diagram 1100 of a processing device (computing system) that may be used to implement one or more disclosed embodiments.

FIG. 11 illustrates a high-level block diagram 1100 of a processing device (computing system) that may be used to implement one or more disclosed embodiments (e.g., cloud resources platform/network 110, client devices 104A-104E, client instance 208, server instances 114, data centers 206A-206B, remote client device 305, client instance 310, etc.). For example, computing device 1100 illustrated in FIG. 11 could represent a client device or a physical server device and include either hardware or virtual processor(s) depending on the level of abstraction of the computing device. In some instances (without abstraction) computing device 1100 and its elements as shown in FIG. 11 each relate to physical hardware and in some instances one, more, or all of the elements could be implemented using emulators or virtual machines as levels of abstraction. In any case, no matter how many levels of abstraction away from the physical hardware, computing device 1100 at its lowest level may be implemented on physical hardware. As also shown in FIG. 11, computing device 1100 may include one or more input devices 1130, such as a keyboard, mouse, touchpad, or sensor readout (e.g., biometric scanner) and one or more output devices 1115, such as displays, speakers for audio, or printers. Some devices may be configured as input/output devices also (e.g., a network interface or touchscreen display). Computing device 1100 may also include communications interfaces 1125, such as a network communication unit that could include a wired communication component and/or a wireless communications component, which may be communicatively coupled to processor 1105. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 11, processing device 1100 includes a processing element such as processor 1105 that contains one or more hardware processors, where each hardware processor may have a single or multiple processor cores. In one embodiment, the processor 1105 may include at least one shared cache that stores data (e.g., computing instructions) that are utilized by one or more other components of processor 1105. For example, the shared cache may be a locally cached data stored in a memory for faster access by components of the processing elements that make up processor 1105. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 11, the processing elements that make up processor 1105 may also include one or more other types of hardware processing components, such as graphics processing units (GPUs), application specific integrated circuits (ASICs), field-programmable gate arrays (FPGAs), and/or digital signal processors (DSPs).

FIG. 11 illustrates that memory 1110 may be operatively and communicatively coupled to processor 1105. Memory 1110 may be a non-transitory medium configured to store various types of data. For example, memory 1110 may include one or more volatile devices such as random access memory (RAM). Non-volatile storage devices 1120 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 1120 may be used to store overflow data if allocated RAM is not large enough to hold all working data. The non-volatile storage devices 1120 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1105. In one embodiment, the compiling process of the software program may transform program code written in a programming language to another computer language such that the processor 1105 is able to execute the programming code. For example, the compiling process of the software program may generate an executable program that provides encoded instructions (e.g., machine code instructions) for processor 1105 to accomplish specific, non-generic, particular computing functions.

After the compiling process, the encoded instructions may then be loaded as computer executable instructions or process steps to processor 1105 from storage 1120, from memory 1110, and/or embedded within processor 1105 (e.g., via a cache or on-board ROM). Processor 1105 may be configured to execute the stored instructions or process steps in order to perform instructions or process steps to transform the computing device into a non-generic, particular, specially programmed machine or apparatus. Stored data, e.g., data stored by a storage device 1120, may be accessed by processor 1105 during the execution of computer executable instructions or process steps to instruct one or more components within the computing device 1100.

A user interface (e.g., output devices 1115 and input devices 1130) can include a display, positional input device (such as a mouse, touchpad, touchscreen, or the like), keyboard, or other forms of user input and output devices. The user interface components may be communicatively coupled to processor 1105. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 1100 may comprise other components well known in the art, such as sensors, powers sources, and/or analog-to-digital converters, not explicitly shown in FIG. 11.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A non-transitory computer-readable recording medium having stored thereon a program, the recording medium comprising instructions that when executed by one or more processing units cause the one or more processing units to:
create a record of a continual improvement process (CIP) on a hosted client instance based on detection of one or more optimizations to improve at least one of a plurality of actions associated with the hosted client instance, wherein the CIP corresponds to the at least one of the plurality of actions, wherein the plurality of actions include service-level actions, process-level actions, or function-level actions, or a combination thereof associated with the hosted client instance;
set a monitored metric with a predetermined target corresponding to the record to measure progress of the CIP over time based on analytical data associated with the monitored metric, the analytical data including data corresponding to a plurality of key performance indicators (KPIs), survey and assessment data, and external analytical data;
identify one or more KPIs of the plurality of KPIs corresponding to a selected one of a service, a process, or a function associated with the hosted client instance based on analytical data associated with the monitored metric for progress measurement of the CIP;
identify one or more tasks associated with the identified one or more KPIs;
identify new optimizations for the CIP to improve one or more actions selected from among the plurality of actions associated with the hosted client instance, wherein the one or more selected actions are associated with the selected one of the service, the process, or the function, based on breakdown data of the identified one or more KPIs;
recommend one or more identified tasks associated with the monitored metric based on the identified optimizations;
set the recommended one or more identified tasks associated with the monitored metric, and monitor completion of the one or more identified tasks; and
present progress data indicating progress toward achieving the monitored metric over time and indicating whether the monitored metric was achieved based on whether the analytical data associated with the monitored metric indicates that the predetermined target was met.

2. The non-transitory computer-readable recording medium of claim 1, wherein the recording medium further comprises instructions that when executed by one or more processing units cause the one or more processing units to:
set a measurable threshold corresponding to the at least one of the plurality of actions associated with the hosted client instance;
monitor trend data to determine whether the set measurable threshold corresponding to the at least one of the plurality of actions is breached; and
detect the one or more optimizations to improve the at least one of the plurality of actions responsive to the determination.

3. The non-transitory computer-readable recording medium of claim 1, wherein the instructions that cause the one or more processing units to set the monitored metric with the predetermined target corresponding to the record comprise instructions that when executed by one or more processing units cause the one or more processing units to:
set an improvement KPI with a current base metric and, as the predetermined target corresponding to the record, a predetermined target metric to be achieved within a predetermined time period; and
embed visualization data associated with the improvement KPI within the record to present the visualization data to a user in real-time,
wherein the progress data indicates that the monitored metric was achieved when the predetermined target metric of the improvement KPI is achieved within the predetermined time period.

4. The non-transitory computer-readable recording medium of claim 1, wherein the instructions that cause the one or more processing units to set the monitored metric with the predetermined target corresponding to the record comprise instructions that when executed by one or more processing units cause the one or more processing units to:
set a survey and assessment topic with a current base metric and, as the predetermined target corresponding to the record, a predetermined target metric to be reached within a predetermined time period,
wherein the progress data indicates that the monitored metric was achieved when the predetermined target metric of the survey and assessment topic is achieved within the predetermined time period.

5. The non-transitory computer-readable recording medium of claim 4, wherein the current base metric and the predetermined target metric of the survey and assessment topic represents a particular KPI whose score is based on sentiment analysis of response data associated the survey and assessment topic over time.

6. The non-transitory computer-readable recording medium of claim 1, wherein the instructions that cause the one or more processing units to set the monitored metric with the predetermined target corresponding to the record comprise instructions that when executed by one or more processing units cause the one or more processing units to:
    set a manual topic with a predetermined target metric to be achieved within a predetermined time period as the predetermined target corresponding to the record, wherein the predetermined target metric is based on the external analytical data over time that is associated with the CIP and that is external to the hosted client instance, and
    wherein the progress data indicates that the monitored metric was achieved when the predetermined target metric of the manual topic is achieved within the predetermined time period.

7. The non-transitory computer-readable recording medium of claim 1, wherein the recording medium further comprises instructions that when executed by one or more processing units cause the one or more processing units to simultaneously present progress data indicating progress toward achieving a plurality of monitored metrics of a plurality of created records of a plurality of CIPs, respectively.

8. The non-transitory computer-readable recording medium of claim 1, wherein the record of the CIP is created on the hosted client instance responsive to a user operation at one of a plurality of integration points respectively corresponding to a plurality of applications deployed on the hosted client instance.

9. A method comprising:
    creating, with one or more processors, a record of a CIP on a hosted client instance based on detection of one or more optimizations to improve at least one of a plurality of actions associated with the hosted client instance, wherein the CIP corresponds to the at least one of the plurality of actions, wherein the plurality of actions include service-level actions, process-level actions, or function-level actions, or a combination thereof associated with the hosted client instance;
    setting, with the one or more processors, a monitored metric with a predetermined target corresponding to the record to measure progress of the CIP over time based on analytical data associated with the monitored metric, the analytical data including data corresponding to a plurality of key performance indicators (KPIs), survey and assessment data, and external analytical data;
    identifying, with the one or more processors, one or more KPIs of the plurality of KPIs corresponding to a selected one of a service, a process, or a function associated with the hosted client instance based on analytical data associated with the monitored metric for progress measurement of the CIP;
    identifying, with the one or more processors, one or more tasks associated with the identified one or more KPIs;
    identifying, with the one or more processors, new optimizations for the CIP to improve one or more actions selected from among the plurality of actions associated with the hosted client instance, wherein the one or more selected actions are associated with the selected one of the service, the process, or the function, based on breakdown data of the identified one or more KPIs;
    recommending, with the one or more processors, one or more identified tasks associated with the monitored metric based on the identified optimizations;
    setting, with the one or more processors, the recommended one or more identified tasks associated with the monitored metric and monitor completion of the one or more identified tasks; and
    presenting, with the one or more processors, progress data indicating progress toward achieving the monitored metric over time and indicating whether the monitored metric was achieved based on whether the analytical data associated with the monitored metric indicates that the predetermined target was met.

10. The method of claim 9, further comprising:
    setting, with the one or more processors, a measurable threshold corresponding to the at least one of the plurality of actions associated with the hosted client instance;
    monitoring, with the one or more processors, trend data to determine whether the set measurable threshold corresponding to the at least one of the plurality of actions is breached; and
    detecting, with the one or more processors, the one or more optimizations to improve the at least one of the plurality of actions responsive to the determination.

11. The method of claim 9, wherein setting, with the one or more processors, the monitored metric with the predetermined target corresponding to the record comprises:
    setting, with the one or more processors, an improvement KPI with a current base metric and, as the predetermined target corresponding to the record, a predetermined target metric to be achieved within a predetermined time period; and
    embedding, with the one or more processors, visualization data associated with the improvement KPI within the record to present the visualization data to a user in real-time,
    wherein the progress data indicates that the monitored metric was achieved when the predetermined target metric of the improvement KPI is achieved within the predetermined time period.

12. The method of claim 9, wherein setting, with the one or more processors, the monitored metric with the predetermined target corresponding to the record comprises:
    setting, with the one or more processors, a survey and assessment topic with a current base metric and, as the predetermined target corresponding to the record, a predetermined target metric to be reached within a predetermined time period,
    wherein the progress data indicates that the monitored metric was achieved when the predetermined target metric of the survey and assessment topic is achieved within the predetermined time period.

13. The method of claim 12, wherein the current base metric and the predetermined target metric of the survey and assessment topic represents a particular KPI whose score is based on sentiment analysis of response data associated the survey and assessment topic over time.

14. The method of claim 9, wherein setting, with the one or more processors, the monitored metric with the predetermined target corresponding to the record comprises:
    setting, with the one or more processors, a manual topic with a predetermined target metric to be achieved within a predetermined time period as the predetermined target corresponding to the record, wherein the predetermined target metric is based on the external analytical data over time that is associated with the CIP and that is external to the hosted client instance, and wherein the progress data indicates that the monitored metric was achieved when the predetermined target metric of the manual topic is achieved within the predetermined time period.

15. The method of claim 9, further comprising simultaneously presenting, with the one or more processors, progress data indicating progress toward achieving a plurality of monitored metrics of a plurality of created records of a plurality of CIPs, respectively.

16. A computer system comprising:

memory; and one or more processing units coupled to the memory, wherein the memory comprises computer instructions that, when executed by the one or more processing units, cause the computer system to:

create a record of a CIP on a hosted client instance based on detection of one or more optimizations to improve at least one of a plurality of actions associated with the hosted client instance, wherein the CIP corresponds to the at least one of the plurality of actions, wherein the plurality of actions include service-level actions, process-level actions, or function-level actions, or a combination thereof associated with the hosted client instance;

set a monitored metric with a predetermined target corresponding to the record to measure progress of the CIP over time based on analytical data associated with the monitored metric, the analytical data including data corresponding to a plurality of KPIs, survey and assessment data, and external analytical data;

identify one or more KPIs of the plurality of KPIs corresponding to a selected one of a service, a process, or a function associated with the hosted client instance based on analytical data associated with the monitored metric for progress measurement of the CIP;

identify one or more tasks associated with the identified one or more KPIs;

identify new optimizations for the CIP to improve one or more actions selected from among the plurality of actions associated with the hosted client instance, wherein the one or more selected actions are associated with the selected one of the service, the process, or the function, based on breakdown data of the identified one or more KPIs;

recommend one or more identified tasks associated with the monitored metric based on the identified optimizations;

set the recommended one or more identified tasks associated with the monitored metric and monitor completion of the one or more identified tasks; and present progress data indicating progress toward achieving the monitored metric over time and indicating whether the monitored metric was achieved based on whether the analytical data associated with the monitored metric indicates that the predetermined target was met.

17. The non-transitory computer-readable recording medium of claim 1, wherein identifying the one or more tasks associated with the identified one or more KPIs comprises:

performing a root cause analysis based on the analytical data associated with the monitored metric and historical analytical data associated with the monitored metric; and determining the one or more tasks to improve the identified one or more KPIs.

18. The method of claim 9, wherein identifying, with the one or more processors, the one or more tasks associated with the identified one or more KPIs comprises:

performing a root cause analysis based on the analytical data associated with the monitored metric and historical analytical data associated with the monitored metric; and determining the one or more tasks to improve the identified one or more KPIs.

* * * * *